United States Patent [19]
Mandel

[11] 3,936,072
[45] Feb. 3, 1976

[54] AXLE LIFT MECHANISM
[76] Inventor: Darwin Mandel, R.R. 1, Huron, S. Dak. 57550
[22] Filed: Oct. 23, 1974
[21] Appl. No.: 517,188

[52] U.S. Cl.......................... 280/104.5 R; 180/24.02
[51] Int. Cl.² ............................................ B60G 5/06
[58] Field of Search..280/104.5 R, 104.5 A, 104.5 B; 180/24.02

[56] References Cited
UNITED STATES PATENTS

| | | | |
|---|---|---|---|
| 2,907,579 | 10/1959 | Masser | 280/104.5 R |
| 3,286,657 | 11/1966 | Browne | 180/24.02 |
| 3,533,641 | 10/1970 | Driskill | 280/104.5 R |
| 3,659,671 | 5/1972 | Heinze | 280/104.5 B |

Primary Examiner—Philip Goodman
Assistant Examiner—John A. Carroll
Attorney, Agent, or Firm—John C. Barnes

[57] ABSTRACT

A lift structure for attachment to the frame of a truck fitted with a tandem axle assembly, one of the axles being a drive axle. The structure comprises a pair of spaced pivotally mounted bell-cranks adapted to reach under the trailing axle of the tandem axle assembly and hydraulic cylinders for rotating the bell-cranks to lift the rear axle when it is unnecessary to use the additional load-bearing axle.

2 Claims, 3 Drawing Figures

AXLE LIFT MECHANISM

BACKGROUND OF THE INVENTION

1. Field of the Invention

This invention relates to a structure for lifting one axle of a tandem load-bearing axle assembly when the load does not require the additional axle for support on the roadway.

2. Description of the Prior Art

The use of auxiliary axles on trucks for providing additional load-bearing wheels is well known in the art and additionally, it is common to hydraulically lift the additional wheels from the road surface when the load is light and the additional load-bearing wheels are not required to meet the axle or load limits. The prior art discloses axles which may be lifted by fluid means acting through the shock dampening support means for the auxiliary axle and other auxiliary road wheel assemblies and lift mechanisms are known in the patent art.

Of the known patents utilizing an auxiliary road wheel structure, in U.S.A. Pat. No. 2,902,289, issued Sept. 1, 1959 to O. G. North. This patent discloses the use of independent wheel structures mounted one on each side of a truck frame. Each independent wheel structure comprises a axle for supporting dual tires and a hydraulic lift mechanism using a bell-crank for forcing the wheels into engagement with the roadway and for lifting the wheels from the roadway. In this structure the hydraulic cylinder is mounted between the bell-crank and a compression spring structure for absorbing road shocks when the wheels are forced into engagement with the roadway. In each structure illustrated in this patent the auxiliary wheels are positioned forwardly of the conventional axle on either the tractor 10 or on the trailer 11. In such a structure it is noted that the cylinders must be active at all times to maintain the wheels in engagement or to lift the wheels. In contrast, in the present structure the fluid pressure is used only when carrying the wheels in a raised position. The special wheel structures illustrated do not anticipate the present invention which is directed to a device for use with trucks having tandem axle structures and which is added to lift the trailing axle to avoid the additional wear on the tires of the auxiliary axle when the load does not require the extra load-bearing wheels.

It should be further pointed out that there are other teachings of lifting wheels which are normally support wheels, out of engagement with a road bed, such as in the structures illustrated in U.S.A. Pat. No. 2,953,390, issued Sept. 20, 1960, to J. H. Hogstrom and U.S.A. Pat. No. 3,235,285, issued Sept. 15, 1966 to P. Tenebaum et al. These patents fail however to anticipate the teaching of the present invention.

The patent to Hogstrom discloses a trailer construction having a tandem axle structure to support the trailer. When the load is delivered the crowned axle support members permit one set of wheels to be lifted and held by the tow chains which can be passed through a hook or loop 65. Such a structure would not be suitable on more conventional tandem assemblies. The patent to Tenebaum et al dislcoses a single axle wheeled unit utilized to raise the conventional tandem wheels from the ground to adjust the height of a trailer to the height of a dock. These structures fail to anticipate the structure of the present invention.

SUMMARY OF THE PRESENT INVENTION

The present invention provides a remote operated lift mechanism for a tandem axle to lift the wheels supported by the axle from engagement with the roadway when the load is sufficiently light that the additional support wheels are unnecessary. This permits truckers to save wear on the tires and yet permits him to utilize the additional wheels when carrying heavy loads to distribute the load over more tire surface, thus reducing damage to the roadways.

The present invention affords a truck axle lift structure for a trailing axle of a tandem truck axle assembly. Generally the forward axle of a dual axle or tandem axle assembly is driven and the present invention permits one to raise the trailing axle of the dual axle assembly. The present invention may also be applied to some trailer tandem axle structures.

The present invention comprises support means adapted for mounting on a truck frame which support means will define a pivot axis, a pair of bell-cranks are carried by said support means in transversely spaced relationship relative to the truck frame. Each bell-crank has a pair of legs, one of which is formed with a cam surface spaced from the support, which cam surface is adapted to slidably engage the undersurface of the trailing axle. The opposite leg of the bell-crank is provided with means for pivotally attaching the bell-crank to a power cylinder. Bracket means are provided for attachment of the power cylinder to the truck frame and the cylinders thus extend longitudinally of the truck frame between the bell-crank and bracket means to lift the axle by the bell-crank upon actuation of the cylinder. The bell-cranks are preferably fixed to a support sleeve rotatably mounted on the transverse shaft on the frame of the tandem axle assembly which is fixed to the truck frame.

DESCRIPTION OF THE DRAWING

The present invention will be further understood after reading the following detailed description which refers to the accompanying drawing wherein like parts are referred to by the same reference numeral and wherein.

DETAILED DESCRIPTION OF THE PREFERRED EMBODIMENT

Figure 1:
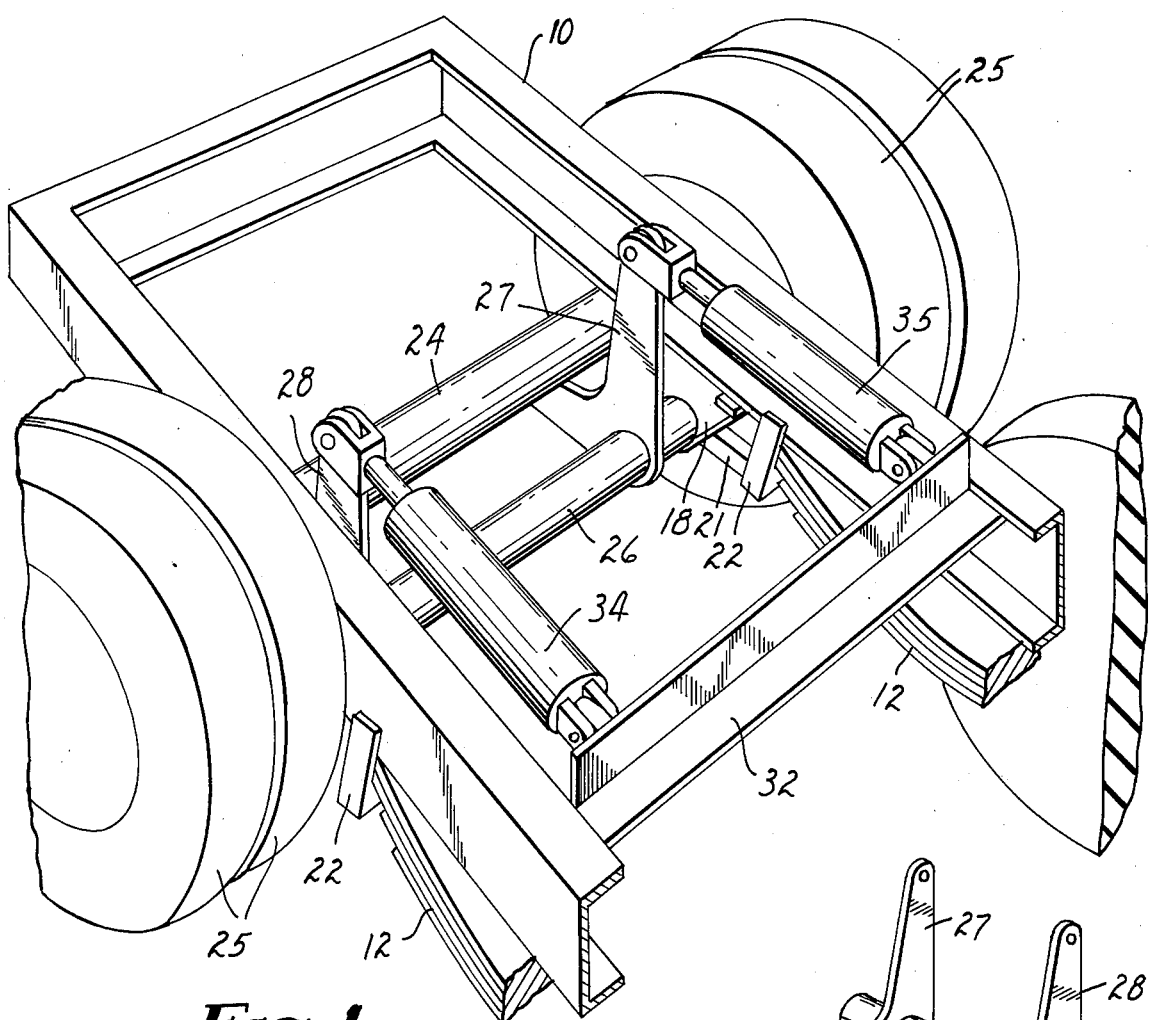
FIG. 1 is a side elevational view of a truck frame partly in section illustrating a known type of tandem axle structure and a lift structure according to the present invention.
Figure 3:
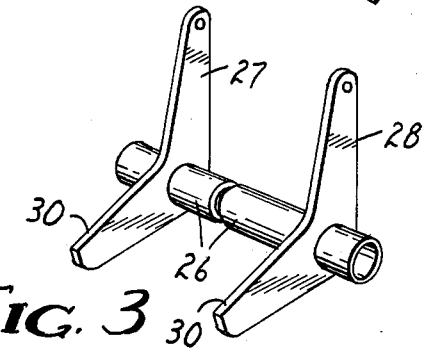
FIG. 3 is a perspective detailed view of the bellcrank lift arms and support.
Figure 2:
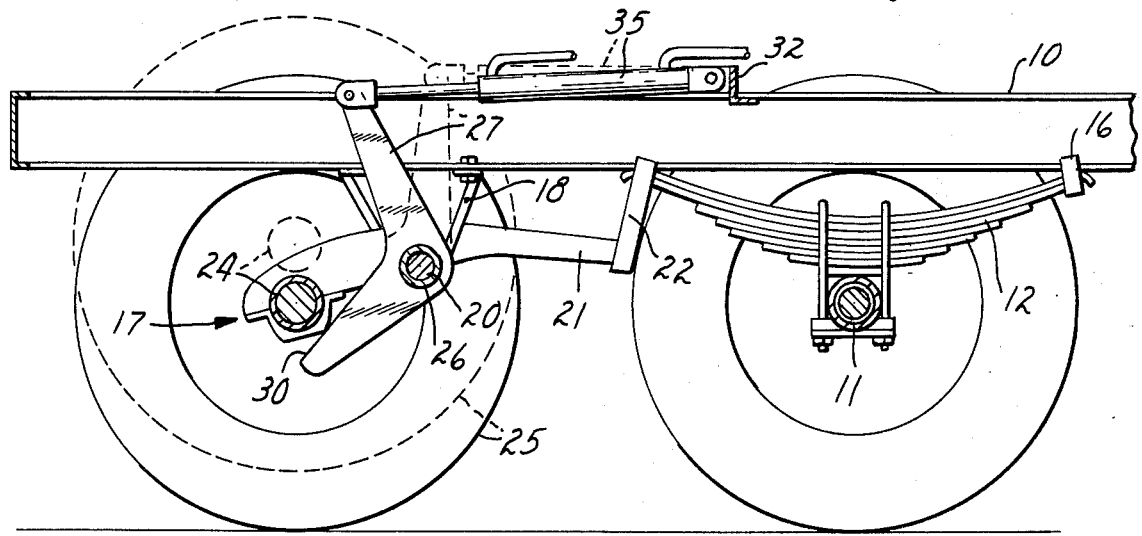
FIG. 2 is a fragmentary perspective view of a truck frame including the lift structure of the present invention.

Referring now to the drawing there is illustrated in FIG. 1 a truck structure comprising a truck frame 10 supported by a rear drive axle 11 supported beneath the frame by a set of conventional leaf springs 12. The drive shaft from the truck extends to the differential of the axle 11. The spring 12 is supported on the frame by a shackle 16 in the front thereof. A tandem axle structure generally designated 17 is positioned rearward of the drive axle 11. This tandem axle structure 17 is supported beneath the frame 10 by a pair of fixed hangers 18 depending from the truck frame. The hangers 18 support a shaft cross 20 upon which are mounted a pair of longitudinally extending arm members 21. The forward end of each of the arm members 21 is provided with a shackle 22 which is fixed thereto and which is fixed to the spring 12 at the location of the normal shackle for the spring. The opposite end of the arms 21 support an axle housing 24 which comprises the opposite brake drums and spindles on which the dual wheels 25 are journalled. This axle structure 24 is a common commercial axle structure afforded for providing a tandem axle on truck assemblies normally not provided with the tandem axle.

The present invention provides a system whereby the axle structure 17 may be raised to lift the wheels from the ground when it is unnecessary to use the tandem axle because of the lightness of the load. The present invention comprises a support means which includes a shaft 26. The shaft 26 is a hollow sleeve which is large enough to fit over the shaft 20 extending between the hangers 18 fixed to the truck frame. Transversely spaced on the sleeve 26 are bell-cranks 27 and 28 each having two arms. One arm is formed with a cam surface 30 which is adapted to engage the underportion of the axle housing 24 between the arms 21. The other arm of the bell-cranks is provided with an opening affording means for securing the bell-cranks to a power cylinder. An angle brace 32 is fixed to the frame forwardly of the hangers 18 supporting the tandem axle. This angle brace 32 supports a pair of ears formed to support power cylinders 34 and 35 which provide the force for moving the bell-cranks about their support to afford a raising and lowering of the axle structure. The cylinders 34 and 35 may be operated hydraulically or by compressed air which is available in the truck for use with other auxiliary equipment such as a bed hoist, steering system, or brakes. A valve in the truck cab will afford a remote operator for directing fluid into the cylinders 34 and 35 to cause the piston and rod thereof to move and to move the bell-cranks.

As illustrated in FIG. 1 in the solid line position the arms of the power cylinder may be extended to allow the tandem wheels 25 to engage the ground and aid to support the load on the truck frame 10. The cylinders 34 and 35 are connected in parallel to the source of fluid pressure so the cylinders will operate in unison. A raising of the axle four to eight inches provides sufficient clearance for the wheels.

Having thus described my invention with reference to the preferred embodiment, it shall be understood that minor changes may be made without departing from the invention claimed in the appended claims:

1. A truck axle lift structure for a trailing axle of a tandem axle structure which trailing axle is supported pivotally on fixed brackets beneath the truck frame supporting a cross shaft, said structure comprising
   support means for mounting on a truck frame to afford a pivot axis, said support means including a hollow shaft adapted to receive said cross shaft,
   a pair of bell-cranks carried by said support means in transversely spaced relationship, each said bell-crank comprising a cam surface spaced from said support means on one arm of said bell-cranks and adapted to slidably engage the undersurface of an axle,
   bracket means for attachment to a truck frame, and
   a pair of power cylinders each connected to a different one of said bell-cranks and to said bracket means for moving said bell-cranks and support means to afford lifting movement of the axle.

2. In combination,
   a vehicle frame,
   a spring supported set of wheels mounted on said frame,
   a tandem axle structure mounted on said frame and including arms secured to the spring supporting said set of wheels,
   support means on said frame for defining a pivot axis between said set of wheels and said tandem axle,
   a pair of bell-cranks carried by said support means in transversely spaced relationship, each said bell-crank comprising a cam surface on one arm of each said bell-crank spaced from said support means and positioned beneath said tandem axle to slidably engage the undersurface of said tandem axle, the other arm of said bellcranks extending radially from said pivot axis and generally normal to said one arm,
   bracket means on said truck frame positioned nearer said set of wheels than said support means for supporting one end of a power cylinder, and
   a pair of power cylinders each connected to a different one of said bell cranks and to said bracket means for moving said bell cranks about said pivot axis to afford lifting movement of said tandem axle toward and away from said frame.

* * * * *